Figure 1:
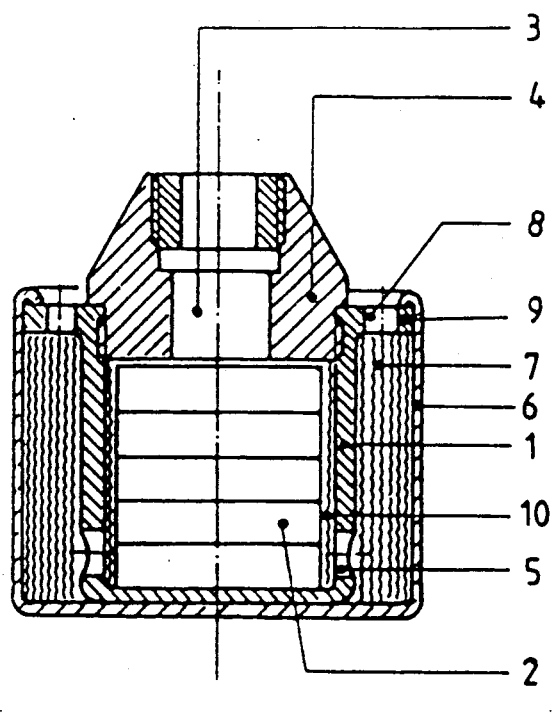

United States Patent [19]

Bender et al.

[11] Patent Number: 5,048,862
[45] Date of Patent: Sep. 17, 1991

[54] GAS GENERATOR FOR AN AIRBAG

[75] Inventors: Richard Bender, Lauf; Hans Winkler, Fürth, both of Fed. Rep. of Germany

[73] Assignee: Dynamit Nobel Aktiengesellschaft, Troisdorf, Fed. Rep. of Germany

[21] Appl. No.: 539,447

[22] Filed: Jun. 18, 1990

[30] Foreign Application Priority Data

Jun. 22, 1989 [DE] Fed. Rep. of Germany ....... 3920401

[51] Int. Cl.$^5$ ............................................. B60R 21/08
[52] U.S. Cl. ..................................... 280/736; 280/741
[58] Field of Search ......................... 280/736, 740, 741

[56] References Cited

U.S. PATENT DOCUMENTS 4,131,299 12/1978 Ono et al. ........................... 280/741
4,734,265 3/1988 Nilsson et al. .

Primary Examiner—Kenneth R. Rice
Attorney, Agent, or Firm—Antonelli, Terry, Stout & Kraus

[57] ABSTRACT

In a gas generator for an airbag of a vehicle, a chamber is provided around a cylindrical pressure reservoir filled with gas-releasing materials. The chamber contains a filter and is traversed over its entire length by a gas stream produced from the gas-releasing materials along a cylindrical outer surface. Such a gas generator is especially suitable for an airbag intended to prevent primarily only the impacting of the driver's head against the steering column while the other protective functions, which are otherwise also to be carried out by an airbag in a vehcle as the sole protective device, are taken over by a safety belt.

12 Claims, 1 Drawing Sheet

GAS GENERATOR FOR AN AIRBAG

This invention relates to a gas generator for an airbag with a substantially cylindrical pressure reservoir filled with gas-releasing materials, the pressure reservoir having an igniter element on a front side and being equipped with gas outlet openings and a filter. Similar gas generators have been known from DE 3,443,325 A1 and DE 3,742,656 A1 (U.S. Pat. No. 4,919,897).

The gas generator in accordance with DE 3,742,656 A1 does meet certain imposed objectives but requires a relatively large amount of space for installation in the steering wheel. Furthermore, the surface of the gas generator becomes relatively hot; a collapsing airbag can fuse to the wall of the pressure reservoir and can thereby be damaged; also, the passenger may incur injuries by the hot surface.

Many countries have laws requiring the driver and the front seat passenger to apply safety belts. Therefore, a buckled-in driver usually need not be restrained and caught solely by the airbag in case of a collision.

The invention is based on the object of further simplifying the gas generator for an airbag and making it more economical, with the added consideration that the airbag be made of a smaller size with the driver being buckled into the seat by a belt.

This object has been attained by an airbag characterized in that a filter is accommodated in an annular chamber externally around a jacket or casing of the pressure reservoir containing gas releasing material, that an igniter element is provided at one end of the pressure reservoir; that gas passage openings are provided in a wall of the pressure reservoir on a side facing away from an igniter element, and that gas outlet openings from the chamber are located in a zone proximate to the igniter element.

The gas generator has substantially a cylindrical shape and can be housed in the steering column of a vehicle; the gas generator axis is congruent with the steering wheel axis. The generated gas is conducted in such a way that the gas route through the filter becomes maximally long. The pressure reservoir contains only the gas-releasing materials and has the openings only at one end. (In case of a pressure reservoir that is installed in the steering wheel, the igniter element faces the driver, and the openings in the pressure reservoir are located on the side facing away from the driver.) A chamber is arranged around the pressure reservoir; although this chamber must also withstand a certain excess pressure, this is by far not the peak stress to which the actual pressure reservoir is exposed, and the chamber is required only for the rerouting of the gas and for accommodating a filter. The gas outlet openings are located in a zone proximate to the igniter element. In this way, the object is obtained that the exiting gases have already cooled down somewhat, and the entrained hot slag particles are very extensively separated and do not pass into the airbag. Such a compact, very efficient gas generator can be housed in practically any steering column of a vehicle or also, for example, in the backrests of mass transit conveyances, such as a bus, an airplane, etc. The total area of the gas outlet openings from the chamber is preferably about twice to three times as large as the total area of the gas passage openings from the pressure reservoir into the chamber.

Figure 2:
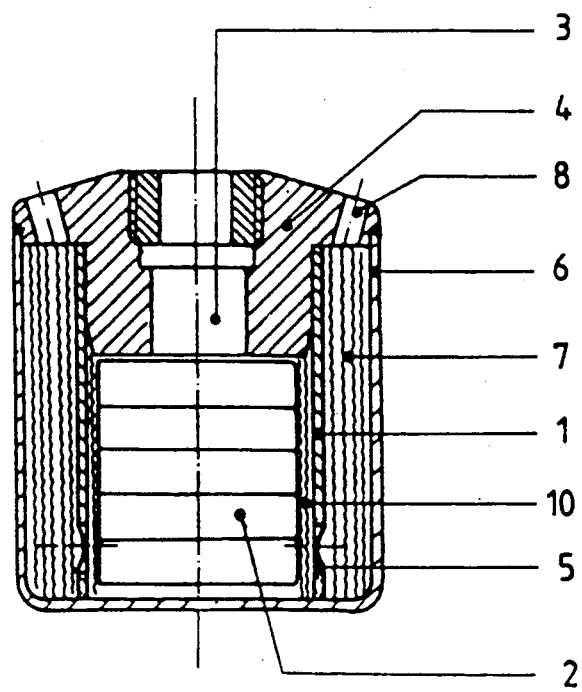

The invention is illustrated by way of preferred embodiments or examples in the accompanying drawings and is hereinafter described in greater detail with reference thereto; wherein in the drawing:

FIG. 1 is a longitudinal section through a gas generator wherein the filter-containing chamber is attached to the pressure reservoir on one end at a flange; and FIG. 2 is a longitudinal section through a gas generator wherein the filter-containing chamber is attached on one end at the support for the igniter element.

The gas releasing material comprises a propellant charge in the form of a tablet column of ring pellets 2 and is housed in a cylindrical pressure reservoir 1. An igniter element 3 on the front end of the generator abuts the bottom of the pellet column in the middle. An electrical section with a sensor system for actuating the igniter element is not illustrated; this feature of the gas generator pertains to the state of the art. A support 4 for the igniter element 3 constitutes the front side or end for the pressure reservoir. The gas passage openings 5 are provided in the cylinder wall of the pressure jacket or casing defining the pressure reservoir 1 on the side facing away from the igniter element 3. These passages lead into a chamber 6 annularly surrounding the pressure reservoir 1. The chamber 6 serves for the accommodation of a filter 7 (e.g. wire gauze or mesh) necessary for filtering the slag particles, resulting from ignition of the propellant charge, out of the generated gas. The gas is also cooled down while flowing through the filter 7. On the side of the chamber 6 proximate to the igniter element 3, the gas outlet openings 8 are arranged; the ratio of the surface areas of the gas passage openings 5 to the surface areas of the gas outlet openings 8 ranges on the order of 1:3. The gas outlet openings 8 permit efflux of the gas, in a cylindrical shape in FIG. 1, and in a conical shape in FIG. 2, into a folded airbag, not illustrated, which airbag is arranged to surround the front side of the gas generator.

In the embodiment according to FIG. 1, a wall portion of the chamber 6 is provided by a flange 9 attached to the casing of the pressure reservoir 1; a wall of the chamber defining an outer housing of the gas generator is folded over this flange, and the gas outlet openings 8 from the chamber 6 are provided in this flange. In the embodiment of FIG. 2, the chamber 6 is welded onto the periphery of the support 4, and the gas outlet openings 8 are constituted or formed by bores in the wall or flange region of the support 4. In both figures, the pellets 2 are combined into a pellet column and surrounded by a wire mesh 10 whereby an all-around uniform spacing of the pellets 2 from the inner wall of the pressure reservoir 1 is obtained.

The gas generator is especially suited for inflating small airbags (volume about 30–35 liters), and fits into practically any steering column. On account of the laws in many countries requiring the wearing of safety belts, the additional airbag safety system is designed, above all, for mitigating the impact of the driver's head against the steering wheel, and this can be achieved even by a small-size airbag. Previous airbags have a volume on the order of 60–70 liters. The proposed gas generator can be manufactured in a very economical way; this should lead to a more rapid adoption of the airbag even for compact cars.

What is claimed is:

1. A gas generator for an airbag comprising a cylindrical casing defining a substantially cylindrical pressure reservoir, said reservoir being filled with gas-releasing material and an igniter element for igniting the gas-releasing material located at one end of the cylindrical casing; a support for supporting said igniter element over said gas-releasing materials and for forming an end wall of the pressure reservoir; gas outlet openings and a filter arranged around the pressure reservoir; said filter being accommodated in a chamber outside of the casing of the pressure reservoir; gas passage openings arranged in a wall of the casing defining the pressure reservoir on a side facing away from the igniter element; and the gas outlet openings leading from the chamber and lying in a zone proximate to the igniter element.

2. The gas generator according to claim 1, wherein said casing has a flange extending around the support for the igniter element, said support extending into one end of the cylindrical casing defining the pressure reservoir and said flange including the outlet openings.

3. The gas generator according to claim 2, wherein the flange is joined to an outer housing which defines the chamber, said chamber being an annular space surrounding said pressure reservoir.

4. The gas generator according to claim 3, wherein a wall of said housing is clamped or crimped to said flange.

5. The gas generator according to claim 1, wherein said support has a flange extending over one end of said chamber, said flange including bores forming said outlet openings.

6. The gas generator according to claim 1, wherein the support for the igniter element has a flange overlying an end of the cylindrical casing and a centrally located recess in which the igniter element is located.

7. The gas generator according to claim 5, wherein a wall of an outer housing surrounding the casing and defining the chamber is welded to an outer periphery of said flange.

8. A gas generator adapted to be accommodated in a steering column and/or steering wheel of a vehicle for inflating an airbag, said gas generator comprising an inner cylindrical casing defining a substantially cylindrical pressure reservoir, said reservoir being filled with gas-releasing material and an igniter element located at one end of the inner cylindrical casing above the gas-releasing material for igniting the gas-releasing material; an outer housing spaced from the inner cylindrical casing to define a chamber outside of the pressure reservoir; a filter arranged around the pressure reservoir and within the chamber outside of the pressure reservoir; gas passage openings leading from the reservoir to the chamber and arranged in a side wall of the inner casing adjacent to an end of the pressure reservoir that is away from the igniter element; and gas outlet openings leading from an end of the chamber and lying in a zone proximate to the igniter element.

9. The gas generator according to claim 8, further comprising a support for supporting said igniter element above the gas-releasing material; said casing having a flange extending around said support, said support extending into the one end of the inner casing and terminating above the gas-releasing material, and said flange including the outlet openings.

10. The gas generator according to claim 9, wherein the flange is joined to the outer housing which defines the chamber, said chamber being an annular space surrounding said pressure reservoir.

11. The gas generator according to claim 10, wherein a wall of said housing is clamped or crimped to said flange.

12. The gas generator according to claim 8, wherein a wall of the housing is welded to an outer periphery of a flange of a support for said igniter element, said support being positioned within the one end of the inner cylindrical casing and forming an end wall of the pressure reservoir.

* * * * *